Figure 1:
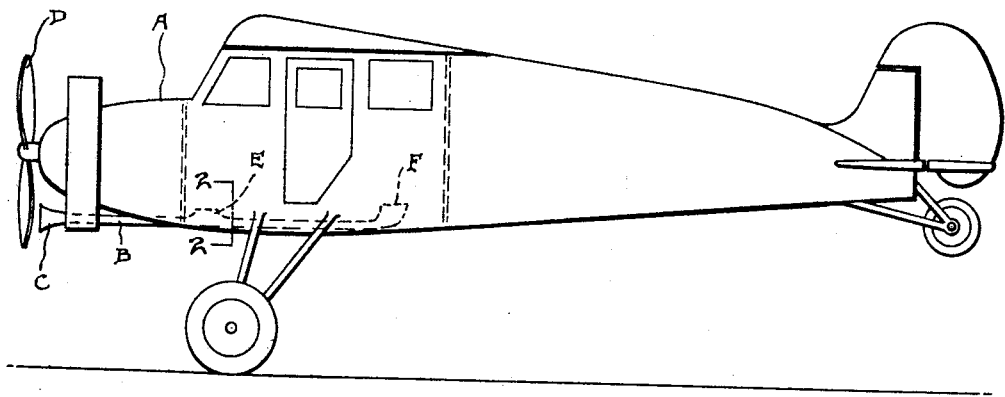
Figure 2:
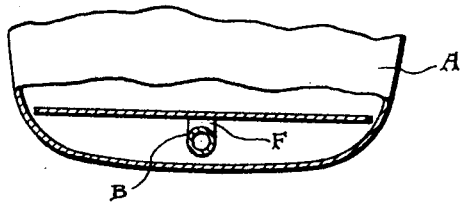

Jan. 12, 1932.  C. F. JENKINS  1,840,393
CABIN AIRPLANE VENTILATION
Filed June 10, 1930

Inventor
Charles Francis Jenkins

Patented Jan. 12, 1932

1,840,393

UNITED STATES PATENT OFFICE

CHARLES FRANCIS JENKINS, OF WASHINGTON, DISTRICT OF COLUMBIA, ASSIGNOR TO C. FRANCIS JENKINS, INC., OF WASHINGTON, DISTRICT OF COLUMBIA

CABIN AIRPLANE VENTILATION

Application filed June 10, 1930. Serial No. 460,178.

This invention relates to fresh air systems for airplanes, especially cabin planes, and has for its main object methods which will give ample fresh air while excluding monoxide and other deleterious gases from the engine exhaust, as well as the disturbing noise coming in through open windows.

The mechanism employed conducts air into the cabin from the fresh air area forward of the engine, or at least from an air area beyond possible contamination by the engine exhaust.

Again, as the intake is pointed forward an actual pressure flow is set up in ducts or tubes employed to bridge the distance between this uncontaminated air area and the cabin, or cockpit, of the plane.

Any elongated body moving longitudinally through a fluid drags along therewith a layer of the fluid of a thickness depending on the velocity of the body and the viscosity of the surrounding fluid. The tenacity with which the fluid clings to the surface of the body is approximately proportional to the square of the velocity.

The result in the case of a cabin airplane is that there is a constant tendency for air to leak in through cracks, wire, pipe, and other openings in the walls of the cabin, as has been repeatedly demonstrated, by applicant, by an exploration with small, light ribbon-like streamers held at the various places studied. Of course, the phenomena is now well known and the hazard recognized in automobiles.

And as the air seeping in through the cabin walls, or coming in through "cracked" windows, is contaminated with monoxide gas from the exhaust, because the exhaust stacks are not carried far enough back, or because of leaks therein, the air in the cabin must be in rapid flow and large volume to prevent monoxide poisoning. Hence the necessity for open windows in cabin planes.

It is now rather generally conceded that many otherwise unexplainable crashes are most readily explained by the "passing out" of the pilot because of monoxide poisoning.

Noise, also, has been one of the annoyances of aviation travel. And as passenger transportation becomes more and more common, efforts are made to add to the comfort of the passengers by keeping noise out of the cabin. This is attempted by padding the walls and using double glass windows, but with only partial success, for no other means than opening the windows is possible for securing poison-gas-free air in the cabin. And opening the windows let in the noise also, of course.

The purpose of this invention is to prevent inward gas leaks into the cabin and pilot's cockpit by providing an uncontaminated atmosphere under pressure inside tight-closed, and approximate sound-proof cabins.

This is attained by providing a duct or ducts with the entrance in the fresh air area just behind the propeller, and with exits inside the cabin.

Each duct is provided with a "scoop" or funnel end to catch and force air into the cabin. This form of entrance to the tube or duct and its location in the slip stream just behind the propeller creates a force flow, and a pressure inside the cabin, with leaks around doors, windows, etc., the only exit. And such a condition insures that no foul gas in contact with the sides of the ship will get into the cabin.

With this object in view, the invention consists of the novel combination of parts described in these specifications, illustrated in the drawing, and more particularly pointed out in the claims.

In the drawing A is an airplane; B an air conduit, duct or tube, with a funnel-shaped intake end C, positioned just behind the propeller D. The forward end of the air duct, which is subjected to severe strain by reason of its location in the slip-stream of the propeller, is rigidly held between adjacent engine cylinders. The after end of the tube opens into the cabin through the floor at E and F. The funnel-shaped entrance is to prevent " spilling " the air over the edges of the entrance end of the tube, and tends to increase the air pressure inside the cabin.

In flight, and especially with the engine driving the propeller at flying speed of the plane, the funnel-shaped tube-end creates an air pressure inside the tube, and consequently an increase of air pressure inside the cabin, with escape only through cracks around doors, windows, etc. This results only in an outflow from the cabin, consequently it is impossible for poisonous gases to enter anywhere.

An airplane fitted with such a forced draft air-entrance to the cabin has been flown with the utmost comfort for hours with the cabin otherwise tight closed. This same plane before being fitted with such a pressure ventilation had crashed in a landing after the pilot had been rendered unconscious by monoxide gas in the cabin.

Aside from the elimination of poison gas hazard, a further result of such pressure ventilation in a closed cabin is a marked increase in the comfort and enjoyment of air travel. One can freely talk to one's fellow-passengers while still confident of an adequate supply of uncontaminated air.

While it is possible the intake end of the air tube might be located elsewhere in uncontaminated air, the location close behind the propeller is ideal as it provides an air pressure in excess of that of any other location.

What I claim, is—

In a ventilating system for cabin airplanes, an engine-driven tractor-propeller on the nose of said plane, a single continuous tube the exit end of which opens into the cabin, and with the intake end located close behind the propeller at the most effective point for air movement, namely, approximately two-thirds of its radial length from the hub.

In testimony whereof I have affixed my signature.

CHARLES FRANCIS JENKINS.